United States Patent [19]

Dall'Aglio et al.

[11] Patent Number: 4,907,345
[45] Date of Patent: Mar. 13, 1990

[54] APPARATUS FOR CHECKING DIAMETRAL DIMENSIONS OF MECHANICAL PIECES

[75] Inventors: Carlo Dall'Aglio, Volta Reno di Argelato; Franco Danielli, Zola Predosa; Guido Golinelli, Bologna, all of Italy

[73] Assignee: Marposs Societá per Azioni, S. Marino di Bentivoglio, Italy

[21] Appl. No.: 191,348

[22] Filed: May 9, 1988

[30] Foreign Application Priority Data

May 27, 1987 [IT] Italy .................. 3492 A/87

[51] Int. Cl.$^4$ ............................ G01B 3/46; G01B 7/28
[52] U.S. Cl. .................................. 33/544.3; 33/555.1; 33/555.2
[58] Field of Search ............. 33/178 R, 178 E, 178 F, 33/147 K, 125 B, 1 H; 285/224, 225

[56] References Cited

U.S. PATENT DOCUMENTS

| | | | |
|---|---|---|---|
| 1,289,044 | 12/1918 | Currie | 277/236 |
| 1,770,548 | 7/1930 | Oven | 277/236 |
| 2,858,126 | 10/1958 | Gomez | 277/236 |
| 3,304,360 | 2/1967 | Hadley et al. | 277/236 |
| 3,436,836 | 4/1969 | Metevia | 33/178 F |
| 3,958,337 | 5/1976 | Anichini | 33/174 L |
| 3,958,338 | 5/1976 | Anichini et al. | 33/178 E |
| 4,237,613 | 12/1980 | Slough et al. | 33/178 E |
| 4,279,079 | 7/1981 | Gamberini et al. | 33/178 E |
| 4,329,782 | 5/1982 | Possati et al. | 33/178 E |
| 4,339,879 | 7/1982 | Selleri | 33/178 E |
| 4,447,960 | 5/1984 | Golinelli et al. | 33/178 E |
| 4,473,951 | 10/1984 | Golinelli et al. | 33/178 E |
| 4,493,153 | 1/1985 | Esken | 33/178 E |
| 4,513,506 | 4/1985 | Vogeleer | 33/178 R |

FOREIGN PATENT DOCUMENTS

1145503 11/1986 Italy .

Primary Examiner—William A. Cuchlinski, Jr.
Assistant Examiner—Thomas B. Will
Attorney, Agent, or Firm—Stevens, Davis, Miller & Mosher

[57] ABSTRACT

An apparatus for checking diametral dimensions comprises a resilient protection element, with a substantially tubular shape, for protecting an internal arm-set by preventing any foreign matter, like chips, from entering inside. In order to obtain a protection element that occupies little space and is particularly resistant to wear, blows, chemical etching etc., the element, substantially cylindrical, is made of a lamina of metal—preferably steel for springs, or nickel, or chromium—, or other materials with similar characteristics. Two feelers are placed at diametrically opposite points of the cylindrical element and as a consequence of the lamina flexions move in a diametral direction. The displacement of the feelers is transmitted to a position transducer. The invention mainly applies to plug gauges used in transfer lines for checking small diameter holes.

29 Claims, 6 Drawing Sheets

APPARATUS FOR CHECKING DIAMETRAL DIMENSIONS OF MECHANICAL PIECES

BACKGROUND OF THE INVENTION

1. Field of the invention.

The present invention relates to an apparatus for checking diametral dimensions of a mechanical piece, with support means, two reciprocally movable feelers for contacting the piece, transducer means for providing a signal responsive to the mutual distance of the feelers, transmission means located between the feelers and the transducer means and protection means for preventing the entry of foreign matter, these protection means including a substantially tubular element coupled to the feelers.

The invention also relates to an apparatus for checking inside diameters of a mechanical piece, comprising support means, two arms movable with respect to the support means and defining free ends, two reciprocally movable feelers cooperating with the free ends of the arms, transducer means for providing a signal depending on the mutual distance of the feelers, and protection means, for preventing the entry of foreign matter, including a resilient substantially tubular element.

Further, the invention relates to an apparatus for checking inside diameters of a mechanical piece, comprising support means, at least two reciprocally movable feelers for contacting the piece, transducer means, for providing a signal depending on the mutual distance of the feelers, with at least two mutually movable elements, protection means, for preventing the entry of foreign matter, with a resilient tubular element and transmission means arranged between the feelers and the transducer means and rigidly connecting said movable elements to the feelers.

2. Description of the prior art.

There are known plug gauges like, for example, the manually applied plug gauge disclosed in U.S. Pat. No. US-A-4,329,782, including an arm-set consisting of a pair of arms connected to a support and movable both mutually and with respect to the support, feelers coupled to the ends of the arms, and a differential transformer position transducer having windings connected to an arm and a core connected to the other arm, for detecting mutual displacements between the arms.

This gauge also comprises a nosepiece fixed to the support, that partially houses the ends of the arms carrying the feelers for protecting the armset from accidental impacts and centering the gauge with respect to the hole to be checked. The nosepiece defines two diametrically opposite holes for the passage of the feelers. These holes must be sufficiently large to enable the feelers to move freely therein and so must allow a certain amount of clearance between each feeler and the edge of the corresponding hole. Thus, through the resulting openings foreign matter may possibly enter inside the gauge and interfere with the arm-set, so causing malfunctions.

This hazard is particularly high in plug gauges installed on "transfer" lines or "transfer" machines: these plug gauges automatically check the dimensions of holes during intermediate phases of relevant machining cycles, consequently in an environment affected by coolants, chips and other residual products of machining. The entering and accumulating of similar foreign matter inside the nosepiece, into contact with the armset, can hamper the feelers from moving freely and may damage or interfere with the parts of the transducer. Consequently, it is necessary to frequently accomplish expensive cleaning operations involving removal of the nosepiece and stopping of the machining, in addition to the risk of damaging the armset during these operations.

Two different methods for facing this problem are followed in the known gauges applied to transfer machines, or in any case in those environments that are characterized by the presence of foreign matter. A first method is based on the discharge of foreign matter in order to prevent the buildup within the gauge. To this purpose there are foreseen additional openings through the nosepiece and there is used compressed air: this type of solution, apart from being particularly expensive for the provision of a specific pneumatic system, may induce the armset or the transducer to malfunction due to perturbations caused by the compressed air, especially if the flow is not constant and continuous.

The second method aims at preventing any foreign matter from reaching the armset.

A plug gauge operating according to this method is described in Italian patent No. IT-B-1145503, apart from having a gasket between the movable arms for protecting the electrical transducer from the possibility of liquids and/or dust entering inside, has another flexible gasket, of a substantially tubular shape and of variable thickness, with two ends resiliently fastened to a cylindrical body of the plug and two protruding annular portions coupled to the feelers. The inside of the plug body is sealed by means of the second gasket, the plug body itself and other elements. In order to protect the second gasket, that is obviously made of a soft material, not very resistant to impacts like, for example, those of hot chips, there is foreseen an external mechanical protection obtained by a stiff nosepiece coupled to the cylindrical body of the plug and provided with openings for the passage of the feelers, featuring limited clearance for preventing the entry of large chips. Furthermore, compressed air is made to flow out of the plug, in particular through an air space between the plug body and the nosepiece and through the openings of the nosepiece, in order to further hamper the entry of chips and other foreign matter. This known plug gauge, apart from being expensive, is considerably bulky, and therefore unsuitable for checking small diameter holes (for example smaller than 8 mm).

In spite of the use of supplementary protections, the risk of breaking the second gasket, even if considerably diminished, is not completely eliminated.

There are also disclosed in U.S. Pat. Nos. US-A-3,958,337 and US-A-3,958,338 plug gauges with armsets comprising metal laminae shaped in various ways (more specifically, M-shaped and U-shaped), to which the feelers are fixed. The laminae, at least partially, replace the movable arms and define, at various accuracy levels, the directions of displacement of the feelers. In these known gauges, particularly suitable for manually checking small diameter holes, the principal function of the laminae is not that of a mechanical protection.

SUMMARY OF THE INVENTION

An object of the present invention is to provide an apparatus for checking diameter dimensions, that guarantees correct operation even under particularly demanding working conditions, and protects the armset from any foreign matter while being accurate and reliable.

Another object is that of employing a particularly simple and rugged structure.

A further object is that of providing a plug type gauge, suitable even for very difficult applications, in particular for checking in transfer lines the diameter of considerably small holes.

The apparatus of the present invention, for checking diametral dimensions of a mechanical piece, comprises support means, two reciprocally movable feelers for contacting the piece, transducer means for providing a signal depending on the mutual distance of the feelers, transmission means arranged between the feelers and the transducer means, and protection means for preventing the entry of foreign matter, the protection means including a resilient substantially tubular element, coupled to the feelers, the material, the thickness, the diameter and the length of the tubular element being chosen so as to have resistance to impacts and wear at least three orders of magnitude greater than those of similar elements made of natural or synthetic rubber.

Another apparatus according to the instant invention, for checking inside diameters of a mechanical piece, comprises support means, two arms movable with respect to the support means, each arm defining a free end, two reciprocally movable feelers, each cooperating with the free end of a relevant arm, transducer means for providing a signal depending on the mutual distance of the feelers, and protection means, for preventing the entry of foreign matter, including a resilient substantially tubular element, the feelers being rigidly fixed to the tubular element and defining outside contact surfaces for cooperating with the piece to be checked and inside reference surfaces for remaining in contact with the free ends of the arms.

A further apparatus according to the invention, for checking inside diameters of a mechanical piece, comprises support means, at least two reciprocally movable feelers for contacting the piece, transducer means, for providing a signal depending on the mutual distance of the feelers, with at least two mutually movable elements, protection means, for preventing the entry of foreign matter, including at least a resilient substantially tubular element, and transmission means arranged between the feelers and the transducer means and rigidly connecting the movable elements to the feelers, the feelers being rigidly fixed to the tubular element, and the material, the thickness, the diameter and the length of the tubular element being chosen so as to have resistance to impacts and wear at least three orders of magnitude greater than those of similar elements made of natural or synthetic rubber.

Through the present invention there is obtained the main result of preventing with certainty that the armset including the transducer means is contaminated by foreign matter, such as residual products of machining and in particular sharp and hot metal chips.

As far as sealing is concerned, the major reliability is achieved, among other things, by manufacturing the tubular element of a sufficiently resilient material and at the same time particularly resistant to wear, blows and chemical etching.

Another result is that the tubular element absorbs a considerable amount of the stresses generated by the friction between feelers and piece, in particular during the dynamic checks and this turns to the advantage of accuracy and repeatability or the possibility of using lighter arm-sets.

Thanks to an appropriate choice of the material employed, the thickness, the diameter and the length of the tubular element, and also to its type of coupling to the other parts of the apparatus, the tubular element can guarantee a compliance with respect to radial forces greater at least two times than that with respect to axial, shear and torsional loads.

Among the main advantages attained by the present invention there is that of obtaining the basic structure of the apparatus in such a way as to avoid complex and costly machinings, by using —through simple processes—cheap and common materials and reducing in a considerable way its dimensions.

Another advantage is that of lightening and simplifying the structure not only of the protection means, but of the apparatus arm-set too, by giving to the protection element functions of defining the rest position of the feelers and the direction of their displacements.

BRIEF DESCRIPTION OF THE DRAWINGS

The invention will be described in detail with reference to the accompanying drawings, given by way of non-limiting example, in which.

DESCRIPTION OF THE PREFERRED EMBODIMENTS

The gauge shown in FIGS. 1 to 4 comprises support means, with a rigid casing 2, that houses, at least partially, an arm-set consisting of an integral member 4, with a substantially U-shaped upper part. Integral member 4 has a first portion 6, corresponding to the base of the U, clamped to casing 2 in a way schematically shown in FIG. 1 by screw 8. Second portions, or arms, 10 and 12, are coupled to the first portion 6 by means of two intermediate sections 14 and 16 having reduced thickness, that define fulcrums enabling arms 10 and 12 to pivot with respect to the first portion 6, and consequently with respect to casing 2, independently from each other.

Figure 1:
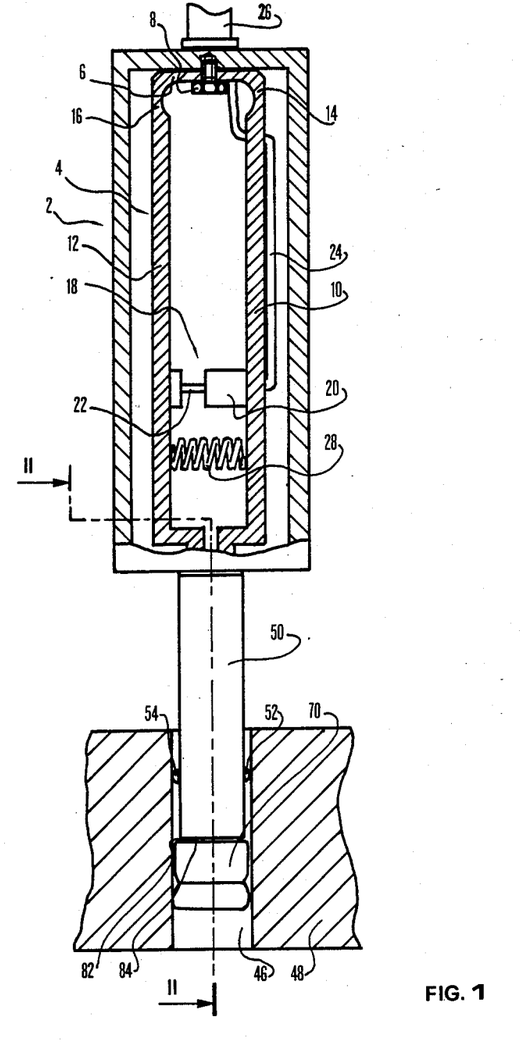
FIG. 1 shows an apparatus, more specifically a plug gauge, in a partly cut-away longitudinal view, according to the preferred embodiment of the invention.

Transducer means, consisting of a differential transformer transducer 18, comprise reciprocally movable elements, namely a support with windings 20 and a magnetic core 22 coupled—in a way that has not been shown in the drawing—to arms 10 and 12, respectively. Electrical wires 24, that are housed in a cable 26, feed transducer 18 and transmit the measurement signal to an amplifier, not shown.

Thrust means comprise a spring 28 that, by cooperating with both arms 10 and 12, biases them apart.

Casing 2, that defines a longitudinal axis of the gauge, comprises an elongated and thin portion 30 (shown in FIGS. 2, 3 and 4) that has the shape of a solid cylinder, with a transversal slot 32 that crosses it from side to side along almost all its longitudinal development, but not in correspondence to an end 34 that is closed. This transversal slot 32 houses the free ends 36, 38 of arms 10, 12 and defines two lateral openings 40, 42 in the elongated portion 30.

The end part 44 of the elongated portion 30 opposite to said closed end 34, has a cross-section of a slightly larger diameter with respect to the remaining part of said elongated portion 30.

Means for protecting the armset of the gauge comprise a structure, or element, of a substantially tubular shape, made of a metal lamina 50 of steel for springs, bent to the shape of a cylinder and having an end fixed, for example glued, to part 44 of portion 30, so as to cover portion 30.

Two feeler elements 52 and 54, for touching the wall of a cylindrical hole 46 of a piece to be checked 48, are fixed to the cylindrical lamina 50 and arranged along a diametral direction. Feelers 52 and 54, the structure of which is also visible in FIG. 5, each comprise a contact surface 56, 58 and a limit stop surface 60, 62 and are adapted for passing through openings 64, 66, obtained in lamina 50 at diametrally opposite positions and for being fixed (e.g. glued) in said openings so as to hermetically close them and let the contact surfaces 56, 58 protrude from lamina 50 so as to touch the wall of hole 46, while the limit stop surfaces 60, 62 are oppositely arranged at the interior of lamina 50.

The free ends 36 and 38 of arms 10, 12 are urged by spring 28 to contact the limit stop surfaces 60 and 62, respectively, of feelers 52 and 54.

The closed end 34 of the elongated portion 30 defines a longitudinal threaded hole 68.

A nosepiece 70 has a through hole 72, along its entire longitudinal development, and an end part 74 with a larger section, with an annular internal limit stop surface 76. Nosepiece 70 is longitudinally fixed to the end part 34 of portion 30 by means of a screw 78 that, by passing through hole 72, engages in threaded hole 68 of portion 30. The clamping between nosepiece 70 and end 34 is achieved by the cooperation between the head of screw 78 and limit stop surface 76. Nosepiece 70 has an external annular groove 80, that is almost entirely covered by the free end of lamina 50 leaving just a thin annular opening 82. Sealing means, consisting of a rubber annular gasket 84, are housed in groove 80 and cooperate with the surface of nosepiece 70 and with the internal surface of lamina 50, to prevent liquids, dust or other materials from entering inside, via opening 82.

In the event of a manual application, the operation of the gauge shown in FIGS. 1 to 4 is the following.

The elongated portion 30 of casing 2 is inserted in cylindrical hole 46, the diameter of which is to be checked; nosepiece 70, that has a substantially cylindrical shape and a maximum diameter size slightly larger than that of portion 30, facilitates the introduction of the gauge, provides its centering within hole 46 and moreover protects the arm-set and lamina 50 in the case of possible impacts against the piece 48 at the edge of hole 46, by transmitting these impacts to casing 2, through portion 30.

In the event of automatic operation, for example at a measuring station of a transfer line, nosepiece 70 can serve just as a mechanical protection and for the actuation of a recoil device, not shown, or—especially when checking small diameter holes—it can maintain a centering function if the plug is mounted on its slide by means of a floating suspension.

The contact surfaces 56, 58 of feelers 52, 54, that—under rest conditions—are at a reciprocal distance greater than said nosepiece maximum diameter, contact the wall of hole 46 at diametrally opposite points, and feelers 52, 54 both move towards each other. The displacements of feelers 52, 54 further to this contact are enabled and defined by lamina 50 that, owing to its particular shape and compliance, is deflected or bent radially. The movement of feelers 52, 54 is transmitted to ends 36, 38 of arms 10, 12, that act as means for transmitting movement to transducer 18 and are urged to move towards each other.

Figure 5:
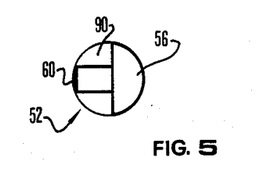
FIG. 5 shows a considerably enlarged constructional detail of a feeler of the gauge shown in the previous figures.

Each of the two feelers 52, 54—as it can be seen in FIG. 5 which refers to feeler 52—is obtained from a spheric element, and consequently the contact surface 56 (58) and stop surface 60 (62) are parts of the same spheric surface 90.

This particular shape of feelers 52, 54 makes negligible those measurement errors which derive from a displacement of the feelers in a not perfectly radial direction, owing to a non symmetrical deflection of lamina 50 or small torsional movements.

The reciprocal movement between arms 10, 12 is detected by transducer 18, that provides—through leads 24—an electrical signal responsive to the reciprocal position of the same arms 10, 12.

When measurement has been taken, the plug is removed from hole 46 and the feelers 52, 54 return to the rest position, as a result of the combined effect of the resilient forces applied by spring 28 and lamina 50. Obviously, the mutual forces among feelers 52, 54 and piece 48 during the measurement taking are due to spring 28 as well as lamina 50.

So lamina 50 accomplishes the following functions:

it protects the internal arm-set (arms 10 and 12, transducer 18, etc.) from residual products of machining like, for example, coolants, chips and tool fragments, because lamina 50 defines a lateral closed surface particularly resistant to etching, wear and impacts against even considerably hard and sharp materials;

it supports feelers 52 and 54;

it determines a safe and stable positioning of feelers 52, 54 along a diametral direction;

it defines the possible displacements of feelers 52, 54, as lamina 50 is considerably stiff to torsions, i.e. with respect to sliding forces applied to feelers 52, 54 in a tangential direction in the case of dynamic checks, i.e.

involving reciprocal rotation between the gauge and piece 48. On the other hand lamina 50 is sufficiently resilient to enable, when it deflects, displacements along a diametral direction, i.e. perpendicularly to the sliding forces;

it applies to feelers 52, 54 biasing forces that combine with those applied by spring 28 through movable arms 10, 12.

From the foregoing it is clear that lamina 50 also partially accomplishes the function of a movable armset.

Obviously lamina 50 may be more or less thick, this will depend, among the other things, on the diameter and depth of hole 46 and consequently on the dimensions of the gauge or the specific need of a different flexibility according to the application, for example depending on the hardness of the material of piece 46. Even the material of the lamina can be a different one (other metals—including corresponding alloys—, resins, composite materials with fiber glass or carbon fibers, etc.) as long as it is suitable for accomplishing the previously described functions.

In any case it is easily possible to obtain that the compliance of the element or lamina 50 along a radial direction be hundreds of times greater than the compliance with respect to combined bending and compressive stresses, shearing stresses, etc.

More specifically, for checking a hole with a nominal diameter of 7.5 mm, a protection device has been used with an outside diameter of 6.5 mm and a 25 mm length, made of a lamina of steel for springs with a constant thickness of 0.04 mm.

Furthermore, the protection and sealing means may also be made in a different way by inserting in the seat defined by groove 80 and by the end of lamina 50 annular gaskets of a specific section, or by pouring appropriate types of rubber or resins in said seat, after clamping nosepiece 70 to portion 30.

Figure 6:
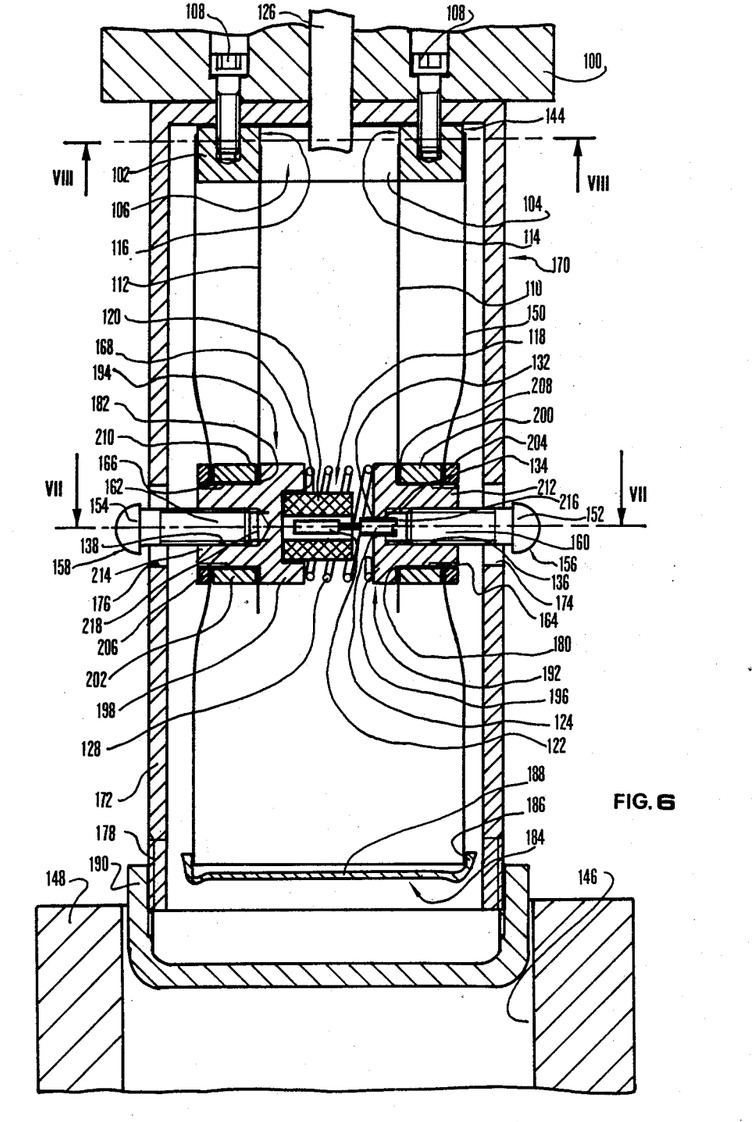
FIG. 6 shows a longitudinal section of a plug gauge according to a second embodiment of the invention.
Figure 7:
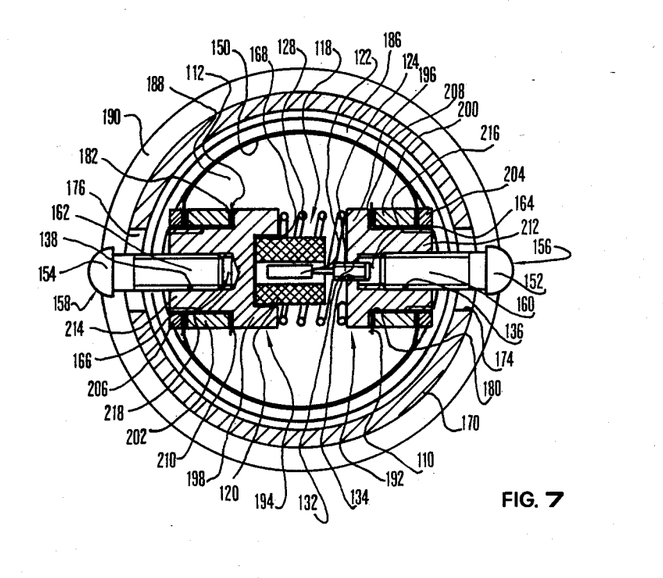
FIG. 7 is a cross-section of the gauge shown in FIG. 6, along path VII—VII in FIG. 6.
Figure 8:
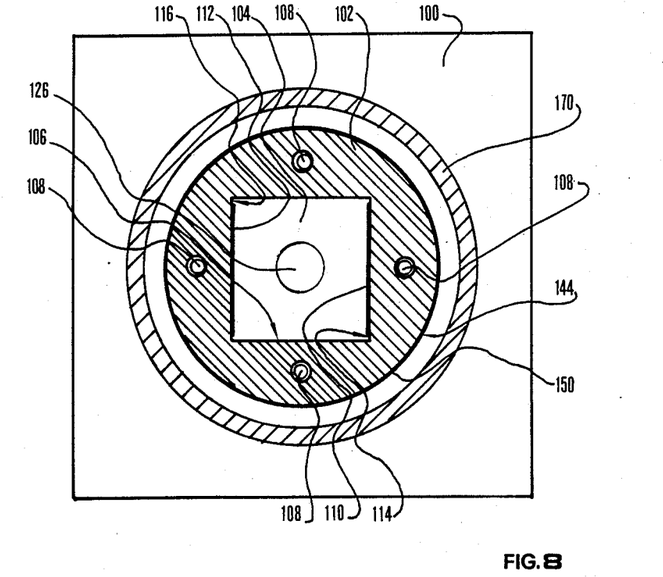
FIG. 8 is a cross-section of the gauge shown in FIGS. 6 and 7, along path VIII—VIII in FIG. 6.

In the gauge shown in FIGS. 6, 7 and 8, an annular element 102 is clamped to an external support, indicated by reference number 100, the latter being connected, for example, to a slide of a measuring station on a transfer line. The clamping of element 102 to support 100 is shown in a very schematical way in the figures by means of screws 108, and also affects a protection nosepiece 170 described hereinafter.

Annular element 102 defines a cylindrical outside surface 144 and a hole 104 with a substantially rectangular section, defined by a surface 106, concentric to the cylindrical surface 144. A lamina 150, bent to a cylindrical shape, is fixed (for example glued, or welded) to an end of the annular element 102, in particular to said outside surface 144.

Resiliently movable support and guide means include a pair of flat springs or laminae 110, 112 fixed (for example glued, or welded) to opposite faces 114, 116 of surface 106.

Cylindrical lamina 150, for example made of metal, defines two through holes 164, 166 in opposite areas along a diametral direction, and the flat springs 110, 112 define second holes 180, 182 coaxial to holes 164, 166 along said diametral direction.

Feelers 152, 154 are fixed, by means of associated supports 192, 194, to lamina 150 and flat springs 110, 112. These supports 192, 194 include support portions 196, 198 housed in seats defined by holes 164 and 180, and 166 and 182, respectively, annular spacers 200, 202 and locking nuts 204, 206. Support portions 196, 198 comprise rest surfaces 208, 210 for cooperating with flat springs 110, 112 in correspondence to the second holes 180, 182 and ends 212, 214, externally threaded, for coupling to nuts 204, 206.

The insertion of spacers 200, 202 around support portions 196, 198, between flat springs 110, 112 and cylindrical lamina 150, and the clamping of nuts 204, 206 to the associated threaded ends 212, 214 ensure stable coupling of support portions 196, 198 to flat springs 110, 112 and cylindrical lamina 150 and define the distance of the flat springs 110, 112 from lamina 50, in correspondence to holes 164, 166, 180 and 182.

Support portions 196, 198 have—at threaded ends 212, 214—threaded holes 216, 218 that form first references housing threaded stems 160, 162 of feelers 152, 154. In this way feelers 152, 154 are fixed to supports 192, 194 in an adjustable way, thanks to selflocking thread inserts 136, 138, too.

The support portions 196, 198 also define second references, opposite to said first references, for the elements of a differential transformer position transducer 118. In more detail, support portion 198 defines a seat 168 wherein there are fixed (glued) windings 120, while portion 196 has a threaded hole 132—communicating with hole 216 and coaxial to it—wherein there is housed a threaded support 124 of a magnetic core 122; said threaded support 124 and a selflocking thread insert 134 provide an adjustable clamping of core 122. The diameter of hole 132 is smaller than that of hole 216, so that core 122 and the associated threaded support 124 can be inserted in the support portion 196 and adjusted through hole 216, prior to the insertion of feeler 152.

Electrical wires, not shown, housed in cable 126, feed transducer 118 and transmit the measurement signal to an amplifier, not shown.

Feelers 152, 154 have contact surfaces 156, 158 for touching the surface of a cylindrical hole 146 of a piece 148 to be checked.

Thrust means, consisting of a compression spring 128 inserted between supports 192, 194 urge contact surfaces 156, 158 of feelers 152, 154 against the surface of hole 146.

The cylindrical lamina 150 has a free end to which there is glued a rubber seal gasket 184, with a circular edge 186 and a closed diaphragm 188.

The protection nosepiece 170 comprises a cylindrical rigid body 172, that houses at its inside cylindrical lamina 150 and has two holes 174, 176 at diametrally opposite points for the passage of feelers 152, 154, and a threaded end 178.

A closure and protection element 190, that is threaded too, is engaged to said end 178 of nosepiece 170.

The gauge shown in FIGS. 6 to 8 is automatically moved from a rearward rest position to a measuring position by an associated slide. In the event that, owing to an inexact positioning or a defect of the piece to be checked, element 190 is unable to enter a hole 146, and collides against a side of piece 148, a recoil device enables the gauge to retract with respect to the slide, so as to prevent damages to the gauge or to the piece 148.

Under normal conditions, element 190 and nosepiece 170 can enter hole 146 and when surfaces 156 and 158 contact the surface of hole 146, feelers 152, 154 and the associated supports 192, 194 move towards each other and compress spring 128. The elements of transducer 118 reciprocally move, integrally with supports 192, 194, so as to obtain the measurement signal.

Figure 2:
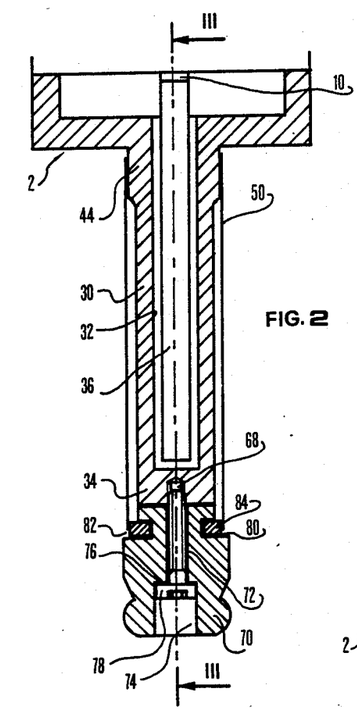
FIG. 2 is an enlarged-scale longitudinal sectional view of a detail of the gauge in FIG. 1, along path II—II in FIG. 1.
Figure 3:
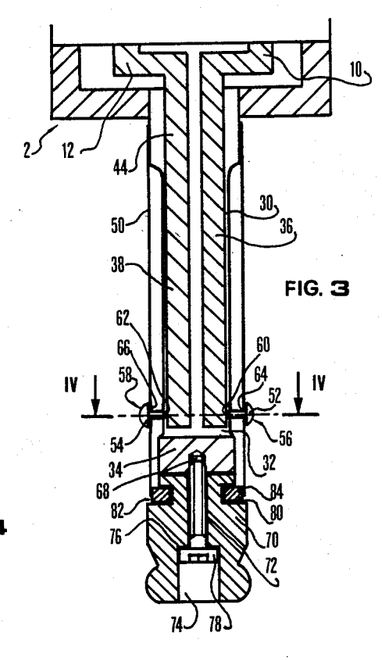
FIG. 3 is a longitudinal sectional view of a detail of the gauge shown in FIGS. 1 and 2, along path III—III in FIG. 2.
Figure 4:
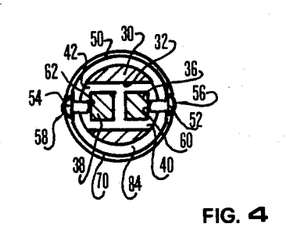
FIG. 4 is a cross-section of the gauge shown in the preceding figures along path IV—IV in FIG. 3.

The functions of lamina 150 are obviously similar to those of lamina 50, shown in FIGS. 1 to 3, except for the following main differences.

Nosepiece 170 prevents, at least partially, foreign matter from reaching lamina 150. In fact, the only way foreign matter may reach the interior of nosepiece 170 is by passing through holes 174, 176.

Lamina 150 is particularly flexible as it has a free end that is closed by seal gasket 184 that opposes a slight resistance; feelers 152, 154 are radially guided also thanks to flat springs 110, 112, that furthermore provide components of the contact and biasing forces applied to feelers 152, 154.

It is obvious that flat springs 110, 112 can be replaced by different elements, for example elongated elements fixed to annular element 102 so as to accomplish limited rotations about axes that are perpendicular with respect to the longitudinal axis of the gauge and to the diametral direction of arrangement of feelers 152, 154.

In the embodiment shown in FIGS. 6 to 8, the accuracy, repeatability and sensitivity of the gauge are also ensured by the absence of transmission levers between the feelers 152, 154 and the mutually movable elements of transducer 118.

The specific structure of the armset shown in FIGS. 6, 7 and 8 also provides a considerably light, rugged and reliable gauge, thanks to the flexibility and sealing features of lamina 150 and the absence of conventional movable arms.

In more detail, in a prototype gauge for checking a hole of 40 mm nominal diameter, there has been used a lamina 150 made of steel for springs 0.03 mm thick. The diameter of the substantially cylindrical element defined by lamina 150 is 27 mm, and its length is 70 mm.

Even the flat springs 110, 112 have been made of steel for springs, 0.3 mm thick.

The gauge shown in FIGS. 9 to 12, is of the "multidiameter plug" type, with a plurality of pairs of feelers coupled to associated movable arms and transducers, and fixed to a single support, for checking different diameter dimensions of a hole with a plurality of cylindrical sections.

Figure 9:
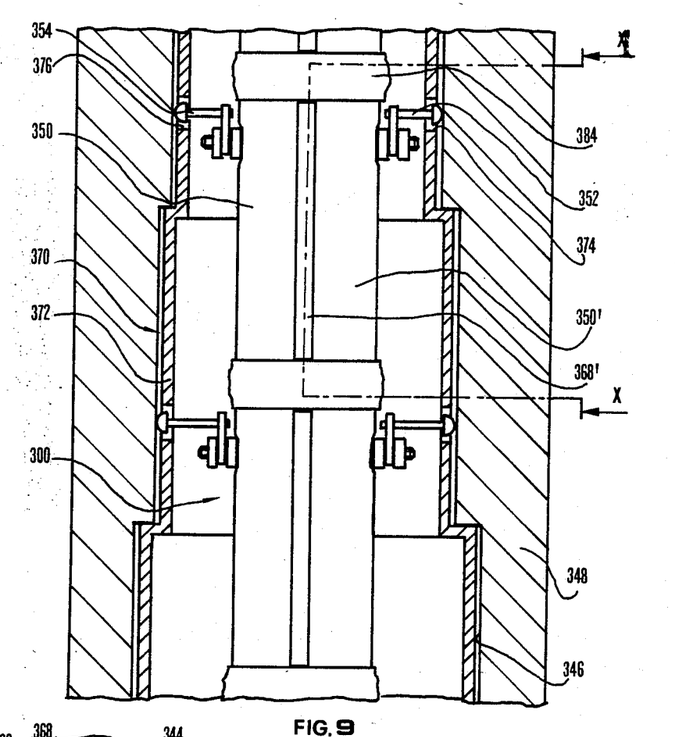
FIG. 9 is a longitudinal partly cut-away view of a multiple plug gauge according to a third embodiment of the invention, in which an external nosepiece has been cut-away in order to show the arm-set structure.

FIG. 9 shows only a part of a multidiameter plug comprising an external protection nosepiece 370, cutaway to show the structure of the arm-set, and support means consisting of an elongated element 300 that defines a longitudinal axis.

Figure 10:
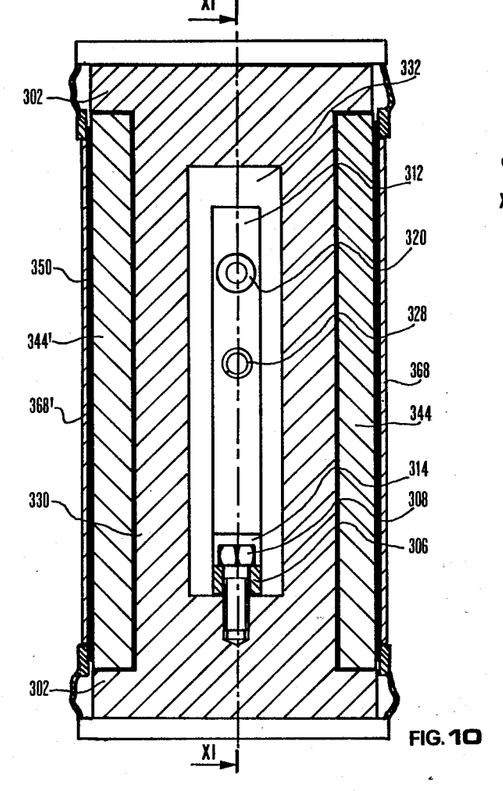
FIG. 10 is an enlarged scale longitudinal sectional view of a detail of the gauge in FIG. 9, along path X—X in FIG. 9.
Figure 11:
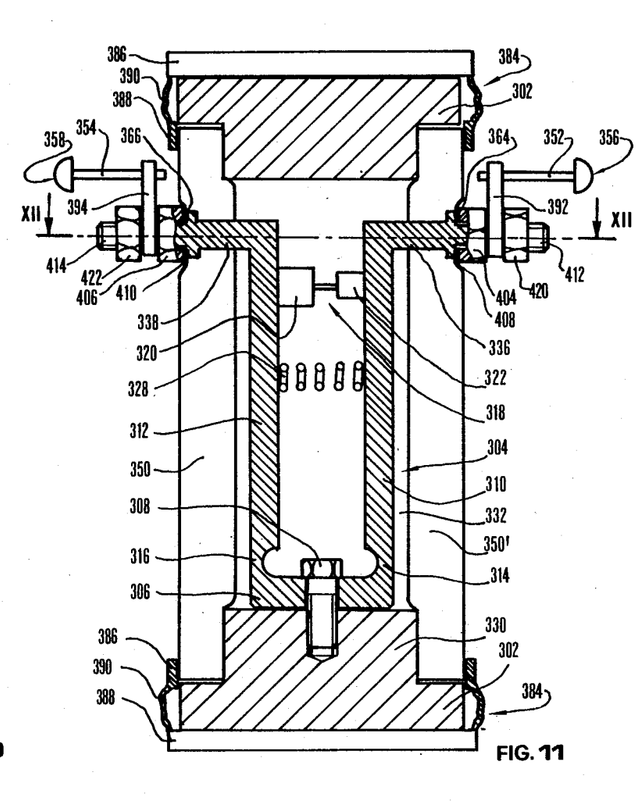
FIG. 11 is a longitudinal sectional view of a detail of the gauge, along path XI—XI in FIG. 10.
Figure 12:
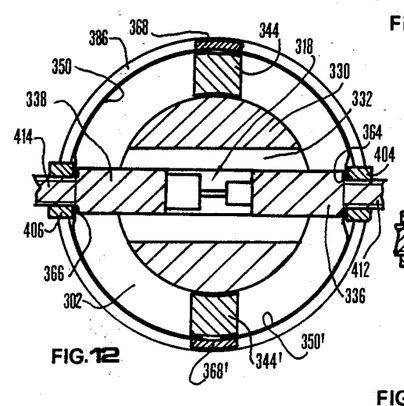
FIG. 12 is a cross-sectional view of the gauge shown in FIGS. 9 to 11, along path XII—XII in FIG. 11.

Element 300 has portions with a larger section 302, that have a substantially annular shape and separate, along the longitudinal axis, cylindrical portions 330. In each of these cylindrical portions 330, as shown in FIGS. 10, 11 and 12, there is a transversal slot 332 that provides a reference seat for a measurement armset consisting of an integral member 304. Said integral member 304 has a substantially U shape and a first portion 306—corresponding to the base of the U—fixed at the interior of slot 332 by means of a screw 308, two portions 310, 312 that form a pair of arms and two intermediate portions 314, 316 that have a smaller cross-section to enable arms 310, 312 rotate about said first portion 306.

A differential transformer transducer 318 comprises windings 320 and a core 322 coupled to arms 312 and 310, respectively. Thrust means including a compression spring 328 urge arms 310, 312 to move away from each other. Arms 310, 312 have free ends 336, 338 with rest surfaces 408, 410 and threaded end portions 412, 414.

Support bars 344, 344' are longitudinally fixed to cylindrical portions 330 and extend from an annular portion 302 to the following one, in opposite positions with respect to the longitudinal axis. Bars 344, 344' define reference surfaces for a pair of metal laminae 350, 350', that belong to gauge protection means. Said laminae 350, 350' are bent in order to define two opposite semicylindrical shells, and each lamina 350, 350' is fixed, for example glued, near its longitudinal edges, to bars 344, 344', so as to form a substantially cylindrical surface surrounding cylindrical portion 330 and its associated armset.

Two closure strips 368, 368' overlap the edges of laminae 350, 350' and are fixed to bars 344, 344' by connections that are not shown, so as to make safer the fixing of the laminae 350, 350' and protect it. Each lamina 350 (350') also has an opening 366 (364) permitting the passage of threaded portion 414 (412) of end 338 (336) of arm 312 (310), but not the passage of rest surface 410 (408) that abuts against lamina 350 (350') about said opening 366 (364).

Locking means include nuts 404, 406, that are engaged to the threaded portions 412, 414 protruding from openings 364, 366 and are clamped to the rest surfaces 408, 410 for locking into position laminae 350', 350 at ends 336, 338 of arms 310, 312.

The threaded end portions 412, 414 protrude even with respect to nuts 404, 406 and feeler supports 392, 394—inserted in through holes (not shown) of the threaded portions 412, 414—are engaged to them; further nuts 420, 422 clamp supports 392, 394 to ends 336, 338, while feelers 352, 354 are fixed in an adjustable way to supports 392, 994 thanks to the cooperation of threaded stems of feelers 352, 354 and selflocking thread inserts, in threaded holes of supports 392, 394, in a way that is not shown in the drawings.

Feelers 352, 354 have contact surfaces 356, 358 for touching the wall of a hole 346 of a piece 348, in correspondence to a determined section.

Feelers 352, 354 and their supports 392, 394 are shown in FIGS. 9 and 11 only, for simplicity's sake.

Tubular rubber gaskets 384 (see FIG. 11) comprise annular ends 386, 388 and a tubular connection portion 390. The annular ends 386, 388 are resiliently coupled to the shells defined by two pairs of adjoining laminae 350, 350', at the opposite ends of and near to a larger section portion 302.

Nosepiece 370 comprises a rigid shell 372 made of steel, with cylindrical portions of different diameters and pairs of diametrically opposite holes 374, 376, for the passage of feelers 352, 354.

Figure 13:
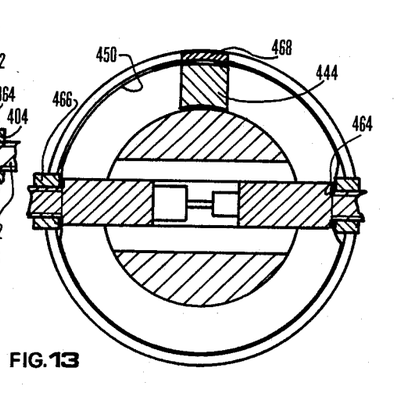
FIG. 13 is a cross-sectional view of a multiple plug gauge similar to the one shown in FIGS. 9 to 12, according to another embodiment of the protection device.

FIG. 13 shows a variant to the plug of FIGS. 9 to 12, that consists in the use of just one metal lamina 450 bent so as to define a substantially cylindrical shell and coupled in correspondence to the longitudinal edges, to a single bar 444 that is quite similar to the previously described bars 344, 344', and with a single closure strip 468. Lamina 450 defines two opposite openings 464, 466 for the passage and the coupling of the ends of the movable arms of an arm-set identical to the one described with reference to FIGS. 9 to 12.

The functioning of the gauge according to FIGS. 9 to 12, or FIG. 13, is the following.

The gauge is inserted manually or automatically in hole 346 of piece 348. Nosepiece 370 is shaped in such a way that the pairs of feelers 352, 354, etc are in correspondence to the sections of hole 346 that have diameters to be checked. The contact surfaces 356, 358 of each pair of feelers 352, 354 are urged against the walls of hoe 346 by the action of spring 328.

Changes in the diameter dimensions of hole 348 cause changes in the reciprocal distances between feelers 352, 354; the transducers 318 transmit to the outside the corresponding electrical signals by means of leads and cables, not shown in the figures.

The functions of laminae 350, 350' and 450 are similar, at least in part, to those of the laminae 50 and 150 of the gauges of FIGS. 1 to 6; the basic function of laminae 350, 350' and lamina 450 is to provide protection.

At a parity of dimensions, the protection device defined by lamina 450 is more resilient with respect to the one defined by laminae 350, 350'.

In a prototype of a multiple plug gauge manufactured according to FIG. 13 there has been used a protection device with an outside diameter of 25 mm and a length of 100 mm, formed by means of a lamina made of steel for springs 0.5 mm thick.

The protection elements 50, 150, 350, 350' and 450 of the gauges shown in FIGS. 1 to 13 have common features of simplicity and inexpensiveness, insofar as the materials used and the machining and assembly operations are concerned. Another important characteristic consists in the small overall dimensions in the radial direction, that enable the checking of considerably small diameters, as already specified with reference to the gauge of FIGS. 1 to 4.

As to the type of materials used, steels for springs are preferred, featuring a stretch modulus of approx 21,000 Kg/mm$^2$ and Rockwell hardness, $H_{Rc}$, greater than 45 Kg/mm$^2$.

However, other materials may be used. In particular, among the metals, nickel, characterized by a stretch modulus greater than 15,000 kg/mm$^2$ and a Rockwell hardness, for example, of 7 Kg/mm$^2$ can be advantageously used, when there are machining and shaping problems. In fact, nickel—that with respect to steel is far less hard and resistant to impacts and wear—can be electrodeposited on a core that is thereafter chemically dissolved.

As further examples, for the protection elements 50, 150, etc there can be used, according to the applications, chromium (it has the advantage of being resistant to chemical etching), phosphor bronze, compound materials containing carbon or glass fibers.

In general, the material and the dimensions of the tubular elements 50, 150, etc are chosen so as to have resistance to impacts and wear exceeding several orders of magnitude (at least three magnitude orders) those of similar elements made of natural or synthetic rubber and to have compliance in radial direction greater by at least two magnitude orders than that with respect to stresses in other directions, in particular axial and torsional stresses.

It is obvious that the present invention, apart from being particularly suitable for applications in plug gauges for checking inside diameters, can have other fields of application, like, for example, electronic ring gauges for checking outside diameters.

What is claimed is:

1. An apparatus for checking diametral dimensions of a mechanical piece, with support means, two reciprocally movable feelers for contacting the piece, transducer means for providing a signal depending on the mutual distance of the feelers, transmission means arranged between the feelers and the transducer means, and protection means for preventing the entry of foreign matter, the protection means including a resilient substantially tubular element defining a longitudinal axis and a lateral surface, the feelers being fastened to said lateral surfaces, wherein the tubular element is made out of a resilient lamina having substantially constant thickness, the material and the geometrical dimensions of the tubular element being chosen so as to have, substantially, stiffness with respect to axial and torsional stresses, resilient compliance in transversal radial direction, and resistance to impacts and wear at least three orders of magnitude greater than those of similar elements made of natural or synthetic rubber.

2. The apparatus according to claim 1, wherein said tubular element has a substantially cylindrical shape.

3. The apparatus according to claim 2, wherein said lamina is made of metal.

4. The apparatus according to claim 3, wherein said lamina is made of steel for springs.

5. The apparatus according to claim 1, wherein said tubular element is fixed to the support means at least at one end.

6. The apparatus according to claim 5, wherein said tubular element is fixed to the support means at both ends.

7. An apparatus for checking inside diameters of a mechanical piece, comprising
    support means,
    two arms movable with respect to the support means, each arm defining a free end,
    two reciprocally movable feelers, each cooperating with the free end of a relevant arm,
    transducer means for providing a signal depending on the mutual distance of the feelers, and
    protection means, for preventing the entry of foreign matter, including a resilient substantially tubular element,
the feelers being rigidly fixed to and supported by the tubular element and defining outside contact surfaces for cooperating with the piece to be checked and inside reference surfaces for remaining in contact with said free ends of the arms, the tubular element being adapted to determine stable positioning and displacement of the feelers along a diametral direction of the mechanical piece.

8. The apparatus according to claim 7, wherein the tubular element has a substantially cylindrical shape defining a longitudinal axis and a lateral surface, the feelers being fastened to said lateral surface, the tubular element being made out of a resilient lamina having substantially constant thickness, the material and the geometrical dimensions of the tubular element being chosen so as to have, substantially, stiffness with respect to axial and torsional stresses, resilient compliance in transversal radial direction, and resistance to impacts and wear at least three orders of magnitude greater than those of similar elements made of natural or synthetic rubber.

9. The apparatus according to claim 8, wherein said lamina is made of metal.

10. The apparatus according to claim 9, wherein said lamina is made of steel for springs.

11. The apparatus according to claim 7, wherein said tubular element is fixed to the support means at least at one end.

12. The apparatus according to claim 7, wherein the support means comprise an elongated portion for housing said free ends of the movable arms, the tubular element being arranged at the outside of the elongated portion, the protection means further comprising a nosepiece fixed to an end of the elongated portion, the nosepiece being adjacent, in a longitudinal direction, with respect to the tubular element.

13. The apparatus according to claim 7, wherein each of said outside contact surfaces and the associated inside reference surface are parts of a same spheric surface.

14. The apparatus according to claim 7, comprising thrust means for urging the free ends of the movable arms to contact said inside reference surfaces.

15. An apparatus for checking inside diameters of a mechanical piece, comprising
support means including an elongated portion,
two arms movable with respect to the support means, each arm defining a free end housed in said elongated portion,
two reciprocally movable feelers, each cooperating with the free end of a relevant arm,
transducer means for providing a signal depending on the mutual distance of the feelers, and
protection means, for preventing the entry of foreign matter, including
a resilient substantially tubular element arranged at the outside of the elongated portion, the feelers being rigidly fixed to the tubular element and defining outside contact surfaces for cooperating with the piece to be checked and inside reference surfaces for remaining in contact with said free ends of the arms,
a nosepiece fixed to an end of the elongated portion, the nosepiece being adjacent, in a longitudinal direction, with respect to the tubular element, and
sealing means adapted for cooperating with said nosepiece and with said tubular element.

16. An apparatus for checking inside diameters of a mechanical piece, comprising
support means,
at least two reciprocally movable feelers for contacting the piece,
transducer means for providing a signal depending on the mutual distance of the feelers, comprising at least two mutually movable element,
protection means, for preventing the entry of foreign matter, including at least a resilient substantially tubular element, and
transmission means arranged between the feelers and the transducer means and rigidly connecting said movable elements to the feelers,
wherein the tubular element defines a longitudinal axis and a lateral surface, the feelers being rigidly fixed to the lateral surface, and is made out of a resilient lamina having substantially constant thickness, the material and the geometrical dimensions of the tubular element being chosen so as to have, substantially, stiffness with respect to axial and torsional stresses, resilient compliance in transversal radial direction, and resistance to impacts and wear at least three orders of magnitude greater than those of similar elements made of natural or synthetic rubber.

17. The apparatus according to claim 16, wherein said tubular element has a substantially cylindrical shape.

18. The apparatus according to claim 17, wherein said lamina is made of metal.

19. The apparatus according to claim 18, wherein said lamina is made of steel for springs.

20. The apparatus according to claim 16, wherein said tubular element is fixed to the support means at least at one end.

21. The apparatus according to claim 20, wherein said tubular element is fixed to the support means at both ends.

22. The apparatus according to claim 16, wherein an end of said tubular element is fixed to the support means and the other end is free, and in which the transmission means comprise two resilient laminae fixed to the support means and two movable supports, each of said movable supports being rigidly fixed to both the lateral surface of the tubular element and one resilient lamina, and carrying both one feeler and one movable element of the transducer.

23. The apparatus according to claim 16, wherein said transmission means comprise at least a pair of arms connected to the support means, movable mutually and with respect to the support means, and that define ends to which there are fixed, in a substantially rigid way, said at least two feelers.

24. The apparatus according to claim 23, wherein the protection means further comprise a substantially rigid nosepiece arranged at the exterior of the tubular element and having holes for the passage of the feelers.

25. The apparatus according to claim 23, comprising a plurality of pairs of arms and a plurality of resilient tubular elements, two feelers being fixed to each resilient tubular element and to the ends defined by each pair of arms.

26. An apparatus for checking inside diameters of a mechanical piece, comprising
support means,
at least two reciprocally movable feelers for contacting the piece,
transducer means for providing a signal depending on the mutual distance of the feelers, comprising at least two mutually movable elements,
protection means, for preventing the entry of foreign matter, including at least a resilient substantially tubular element made of a lamina having substantially constant thickness, the tubular element having an end fixed to the support means and a free end, and a sealing gasket fixed to the free end of the tubular element, and
transmission means arranged between the feelers and the transducer means and rigidly connecting said movable elements to the feelers,
the transmission means comprising two resilient laminae fixed to the support means, the feelers being rigidly fixed to the tubular element and to the resilient laminae, the material and the geometrical dimensions of the tubular element being chosen so as to have, substantially, stiffness with respect to axial and torsional stresses, resilient compliance in transversal radial direction, and resistance to impacts and wear at least three orders of magnitude greater than those of similar elements made of natural or synthetic rubber.

27. The apparatus according to claim 26, wherein the protection means further comprise a rigid nosepiece arranged at the outside of said tubular element and having holes for the passage of feelers.

28. An apparatus for checking inside diameters of a mechanical piece, comprising
support means,
at least two reciprocally movable feelers for contacting the piece, transducer means for providing a signal depending on the mutual distance of the feelers, comprising at least two mutually movable elements, protection means, for preventing the entry of foreign matter, including a resilient tubular element obtained by means of a pair of laminae bent in order to define two opposite semicylindrical parts, with longitudinal edges fixed to the support means, and transmission means arranged between the feelers and the transducer means and rigidly connecting said movable elements to the feelers, the transmission means comprising at least a pair of arms connected to the support means, movable mutually and with respect to the support means, and that define ends to which there are fixed, in a substantially rigid way, said at least two feelers, the feelers being also rigidly connected to the tubular element, the material and the geometrical dimensions of the tubular element being chosen so as to have, substantially, stiffness with respect to axial and torsional stresses, resilient compliance in transversal radial direction, and resistance to impacts and wear at least three orders of magnitude greater than those of similar elements made of natural or synthetic rubber.

29. An apparatus for checking inside diameters of a mechanical piece, comprising support means, at least two reciprocally movable feelers for contacting the piece, transducer means for providing a signal depending on the mutual distance of the feelers, comprising at least two mutually movable elements, protection means, for preventing the entry of foreign mater, including a resilient tubular element obtained by a lamina bent to a substantially cylindrical shape and having longitudinal edges fixed to the support means, and transmission means arranged between the feelers and the transducer means and rigidly connecting said movable elements to the feelers, the transmission means comprising at least a pair of arms connected to the support means, movable mutually and with respect to the support means, and that define ends to which there are fixed, in a substantially rigid way, said at least two feelers, the feelers being also rigidly fixed to the tubular element, the material and the geometrical dimensions of the tubular element being chosen so as to have, substantially, stiffness with respect to axial and torsional stresses, resilient compliance in transversal radial direction, and resistance to impacts and wear at least three orders of magnitude greater than those of similar elements made of natural or synthetic rubber.

* * * * *

UNITED STATES PATENT AND TRADEMARK OFFICE
CERTIFICATE OF CORRECTION

PATENT NO. : 4,907,345
DATED     : March 13, 1990
INVENTOR(S) : Carlo DALL'AGLIO et al It is certified that error appears in the above-identified patent and that said Letters Patent is hereby corrected as shown below:

Column 12, line 4 "surfaces" should be --surface--.

Signed and Sealed this

Fourth Day of June, 1991

Attest:

HARRY F. MANBECK, JR.

*Attesting Officer*        *Commissioner of Patents and Trademarks*